United States Patent [19]

Eckler

[11] Patent Number: 5,278,280
[45] Date of Patent: Jan. 11, 1994

[54] HARD RESINOUS POLYOLS

[75] Inventor: Paul E. Eckler, Linthicum, Md.

[73] Assignee: Imcera Group Inc., Northbrook, Ill.

[21] Appl. No.: 543,870

[22] Filed: Jun. 26, 1990

Related U.S. Application Data

[63] Continuation-in-part of Ser. No. 302,178, Jan. 27, 1989, abandoned.

[51] Int. Cl.$^5$ ............................................. C08G 63/20
[52] U.S. Cl. ................................... 528/272; 528/296; 528/298; 528/299; 528/300; 528/304; 528/305; 528/306; 528/308.6; 525/437; 525/444; 525/445; 525/450; 525/451
[58] Field of Search .............. 528/272, 296, 298, 299, 528/300, 304, 305, 306, 308.6, 272.1; 525/437, 444, 445, 450, 451

[56] References Cited

U.S. PATENT DOCUMENTS

| | | | |
|---|---|---|---|
| 29,118 | 1/1977 | Stamberger | 521/137 |
| 2,527,057 | 1/1948 | Canfield | 524/601 |
| 3,345,313 | 10/1967 | Rubf et al. | 524/601 |
| 3,345,339 | 10/1967 | Parker et al. | 528/283 |
| 3,502,620 | 3/1970 | Caldwell | 525/437 |
| 4,094,055 | 9/1977 | van der Linde | 524/27.6 |
| 4,133,786 | 1/1979 | Harris et al. | 523/501 |
| 4,208,488 | 6/1980 | Kraft et al. | 525/107 |
| 4,391,648 | 7/1983 | Ferrill, Jr. | 106/308 |
| 4,396,746 | 8/1983 | Toga | 525/444 |
| 4,398,034 | 8/1983 | Edmondson et al. | 560/1 |
| 4,489,182 | 12/1984 | Valko | 523/414 |
| 4,593,077 | 6/1986 | Borman et al. | 525/444 |
| 4,729,927 | 3/1988 | Hirose et al. | 428/480 |
| 4,798,859 | 1/1989 | Hohlein et al. | 525/7 |

Primary Examiner—John Kight, III
Assistant Examiner—S. A. Acquah
Attorney, Agent, or Firm—Wendell Ray Guffey; Lance G. Johnson; Thomas L. Farquer

[57] ABSTRACT

Hard resinous polyol esters having a high degree of hydroxyl functionality and a ball and ring softening temperature of at least about 50° C.

11 Claims, No Drawings

HARD RESINOUS POLYOLS

This application is a continuation in part of U.S. patent application Ser. No. 302,178 filed on Jan. 27, 1989, now abandoned.

FIELD OF THE INVENTION

The invention relates to polyol resins having a ball and ring softening temperature of at least about 50° C. and having a high degree of hydroxyl functionality.

BACKGROUND OF THE INVENTION

Polyol resins are useful sources of hydroxyl functionality in the manufacture synthetic lubricant esters, rosin esters for printing ink vehicles, tackifying resins, and alkyd resins for paints and coatings. Each of these products can benefit from a polyol resin that is "hard". Hard resins are desirable for fast drying ink varnishes or ink vehicles. Hardness is also useful for producing synthetic lubricants with low viscosities at arctic temperatures (about −40° F.) and good thermal stability at higher temperatures. The "hardness" of resins is measured by the conventional ball and ring softening temperature and is an indication of both the melting point and viscosity of the resin.

Resins presented as "hard", however, have different physical forms and relatively low hydroxyl functionality. Many purportedly "hard" resins are highly viscous liquids or gelatinous semisolids which are useful to some extent but are inconvenient to package and transport. These resins usually have a limited degree of hydroxyl functionality at the terminal ends of the polymer chain.

It would be desireable to have a hard polyol resin with a high degree of hydroxyl functionality.

It would also be desireable to have a hard polyol resin that exhibited a solid physical form that could be easily packaged and transported.

SUMMARY OF THE INVENTION

It is an object of tile invention to provide a resinous polyol product having a high degree of hydroxyl functionality with a ball and ring softening temperature of at least 50° C.

It is another object of this invention to provide a resinous polyol product that is solid at room temperature.

In accordance with these and other objects which wig become apparent from the description below, the invention comprises a resinous polyol ester condensation product having a ball and ring softening temperature of at least 50° C. made by esterifying a reaction mixture of a polycarboxylic acid and at least one polyol in a ratio sufficient to provide a polyol resin copolymer that is terminated with hydroxyl groups. The acid and polyol m the reaction name ratio are represented by the following:

Acid: acid component of the formula: $aR^1$(acid moiety)$_b$ wherein:

$R^1$ is aromatic, alkylaromatic, saturated or unsaturated cyclic, N or O substituted heterocyclic, or linear or branched aliphatic;

the acidic moiety is a carboxylic acid moiety, an acid chloride, a C1-C6 acid ester, or the anhydride (—$CO_2$)O;

"a" represents the total number of number of moles of acid for each polyacid component and is at least 1; and "b" is the total number of acid moieties for each acid molecule at charge and is at least 2;

Polyol: at least one polyol of the formula: $cR^3(OH)_d$ wherein:

$R^3$ is linear or branched aliphatic, saturated cyclic, or O substituted heterocyclic;

"c" represents the number of total number of moles of polyol and is greater than or equal to "a" but less than or equal to the product of "a" and "b"; and "d" is the total number of hydroxyl moieties per polyol molecule and is at least 1; and the product of "c" and "d" is the total number of moles for each individual acid multiplied by the number of acid moieties for said individual acid and is greater than or equal to the product of "a" and "b" which represents the total number of moles for each individual polyol multiplied by the number of hydroxyl moieties for said individual polyol ($cd \geq ab$).

These polyol resin products have a high degree of hydroxyl functionality and hardness. Many are in a convenient solid form.

DETAILED DESCRIPTION OF THE INVENTION

The polybasic acids useful for the invention include the acid, the methyl ester, or the anhydride form of a polybasic carboxylic acid. Since the corresponding anhydrides and methyl esters are equivalent to the stated acids, it will be understood that reference herein and in the claims to polycarboxylic acids will include use of the corresponding anhydrides and methyl esters where they exist.

Polycarboxylic acids of the invention have the general formula: $aR^1$(acid moiety)$_b$ wherein:

$R^1$ = aromatic, alkylaromatic, saturated or unsaturated cyclic, N or O substituted heterocyclic, linear or branched aliphatic;

the acidic moiety is a carboxylic acid moiety, an acid chloride, a C1-C6 acid ester, or the anhydride (—$CO_2$)O; and "b" is the total number of acid moieties for each acid molecule at charge and is at least 2.

The aromatic constituents should have less than or equal to about 14 carbon atoms, preferably less than or equal to 10 carbon atoms. Preferred aromatics include the monocyclic and bicyclic aromatics such as those derived from benzene and naphthalene. The alkyl constituents of the above aromatics with alkyl chains should have less than about sm carbons, preferably less than about three carbons. Preferred alkyl groups are methyl and ethyl.

The saturated or unsaturated cyclic groups should have not more than about 10 carbon atoms. Preferred cyclic groups have five or six carbons, e.g. hexahydrophthalic anhydride and tetrahydrophthalic anhydride. The heterocyclic compounds are oxygen or nitrogen substituted of less than or equal to about 10 carbon atoms. Preferred heterocychc compounds are monocyclic materials having one oxygen or nitrogen in the ring such as materials derived from furan or pyridine.

Finally, the linear or branched aliphatic compounds have less than or equal to about 10 carbon atoms, preferably less than or equal to about 5 carbon atoms. Exemplary aliphatic acid compounds include maleic and succinic acid.

A list of contemplated polycarboxylic acid compounds useful for the invention individually and in combination includes: isophthalic acid, terephthalic acid, trimellitic acid, naphthalenedicarboxylic acid, pyridinedicarboxylic acid, dimethylrerephthalate, isophthaloyl chloride, furandicarboxylic acid, benzenetetracarboxylic acid, benzenepentacarboxylic acid, benzenehexacarboxylic acid, phthalic anhydride, trimellitic anhydride, hexahydrophthalic anhydride, methyltetrahydrophthalic anhydride, succimc anhydride, maleic anhydride, citraconic anhydride, adipic acid, itaconic acid, diethyl fumarate, and methyl esters of each of the above. The most preferred acid components are: terephthalic acid, succinic acid, isophthalic acid, maleic acid, fumaric acid, and phthalic acid or their anhydrides or methyl esters where available.

The polyols useful for the invention individually and in combination include linear or branched aliphatics, saturated cyclic or oxygen-substituted heterocyclics, of less than or equal to 30 carbon atoms and which have at least two hydroxyl groups per molecule. Polyols contemplated to be useful for this invention include: pentaerythntol (PE), trimethylolethane (TME), tnmethylolpropane (TMP) glycerine, dipentaerythritol (DiPE), ditirimethylolpropane, neopentyl glycol, ethylene glycol, propylene glycol trimethylpentanediol, cyclohexanedimethanol, 1,3-butanediol, 1,4-butanediol, mannitol, sorbitol and methyl glucoside. The most preferred polyols are: pentaerythntol trimethylolethane, trimethylolpropane, and glycerine.

Mixtures of polyols may also be used to prepare hard polyol resins according to the invention. For example, a combination of pentaerythritol and trimethylolethane (about 80 mol % TME) may be esterified with a polycarboxylic acid to produce a hard, resinous product according to the invention. Mere routine experimentation will be needed determine the particular ratio of specific polyols that is needed to produce a hard resin according to the invention instead of a gel in light of the description herein.

The goal of the invention is to produce a stoichiometric polyol resin product having hydroxyl groups m terminal positions and at least one hydroxyl group on the backbone chain of the copolymer. This product is attained by using a reaction mixture having the acid and polyol components present m a specific relationship so as to produce a hydroxyl concentration above that required to react with every reactive carboxylic acid group. The exact ratio of the mixture will, of course, depend on the functionality of the acid and the polyol.

As described above, the polycarboxylic acid and polyol for the invention can be represented by the following:

$$aR^1(\text{acid moiety})_b \quad \text{Polyol}=cR^3(OH)_d$$

The reaction mixture relationships can be illustrated with an example using a dicarboxylic acid ("b"=2) and a triol ("d"=3). To make the product esters according to the invention, the components should be reacted so that in the stoichiometric product "a" is greater than 1; "c" is greater than or equal to "a" but less than or equal to 2"a"; and the product of "c" and "d" is within the range of at least 3a to less than or equal to 6a. The stoichiometric product is the product that would be formed if each acid group reacted with each hydroxyl group to completion without side reactions or undesired by-products.

The product of "c" and "d" relative to the product of "a" and "b" is a measure of the hydroxyl functionality present in the reaction mixture relative to the carboxylic acid functionality of the reactive carboxylic acid groups. When the product of "c" and "d" is greater than "a" and "b", the reaction mixture contains excess hydroxyl functionality which will result in polyol resins having terminal hydroxyl groups and hydroxyl groups along the polymer backbone. Preferably, the reaction mixture contains at least about 50 mol % excess hydroxyl functionality. More preferably, the reaction mixture contains at least about 60 mol % excess hydroxyl functionality. The most preferred hydroxyl functionality is about 65 to about 100% excess hydroxyl functionality with about 65 to about 80 mol % excess hydroxyl functionality being particularly satisfactory. The excess hydroxyl functionality can be calculated as:

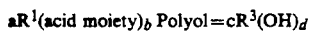

$$\text{Excess mol \%} = \frac{cd - ab}{ab} \times 100$$

The descriptive label "hard" is used in connection with esters according to the invention to denote a resin having a ball and ring (B and R) softening temperature of at least about 50° C. Preferably, the resin has a B and R temperature of at least 60° C. and even more preferably having a B and R temperature of at least 70° C.

The magnitude of the hardness of the synthetic polyol resins according to the invention will depend on the melt points of the polyol and the acid. The hardness of the product follows the melt point of the polyol but does not closely follow the melt point of the acid. These relationships are illustrated by the examples presented in Tables 1 and 2.

TABLE 1

|  | PE | TME | TMP | Gly |
|---|---|---|---|---|
| Polyol Melting Point (°C.) | 262 | 191–200 | 58.8 | 17.6 |
| Terephthalate Ester Ball and Ring (°C.) | 133 | 71.5 | 46.0 | 25 |
| ICI Viscosity, Poise 125° C. | 40 | 24.8 | 16.8 | 3.6 |

PE = Pentaerythritol
TME = Trimethylolethane
TMP = Trimethylolpropane
GLY = Glycerine

TABLE 2

|  | TA | SA | MA | IPA | FA | PA |
|---|---|---|---|---|---|---|
| Acid Melting Point (°C.) | 300 | 188 | 139 | 260 | 300–2 | 231 |
| Hard Resin, Ball and Ring (°C.) | 133 | 127 | 102–3 | 101.5–2 | 94.5 | 86 |

TA = Terephthalic acid
SA = Succinic Acid
MA = Maleic Acid
IPA = Isophthalic Acid
FA = Fumaric Acid
PA = Phthalic Acid The esterification process can be carried out with or without a solvent. If a solvent is used, water of reaction can be removed during the process simultaneously with solvent by azeotropic distillation. If a solvent is not used, the reaction water can be removed as steam to shift die reaction equilibrium toward the product side.

The esterification can also be performed with or without catalysts. If used, the catalysts should be present in quantities of about 0.01 to about 1 percent by total weight. Exemplary catalysts include: stannous chloride, stannic chloride, butyl stannoic acid, tetrabutyl titanate, zinc carbonate, toluene sulfonic acid, dibutyltin oxide, stannous octoate, stannous oxalate, and phosphoric acid. The preferred catalysts and their quantities will depend on the reactants and can be determined with no more than routine experimentation.

The esterification temperature should be between 80° C. and the decomposition temperature of the reactants. Preferably, the temperature is close to the decomposition temperature of the reactants in order to maximize the reaction rate. Such a temperature range would generally be about 180° to 220° C.

The reaction pressure should be less than 20 atmospheres and preferably less than about 1.5 atmospheres. The higher pressures can be used if volatile reactants are present.

Minor quantities of conventional resin additives may also be used if desired. These additives may be present in quantities up to about 20,weight percent of the total resin weight. Exemplary additives include: cottonseed oil, linseed oil, peanut oil, safflower oil, sunflower oil, tallow oil, tongue oil, and walnut oil. Other oils and fatty acids may be used in addition to or instead of those listed above.

Polybasic acids and polyols of high melting point solids are difficult to react directly. There is a tendency for them to char before they liquify and esterify. Carefully controlled heating can be used with success, but such careful control is fragile and time-consuming. Some form of continuous liquid phase is desirable for transferring heat evenly without charring.

A liquid medium can be formed in a number of ways. The acid or anhydride can first be melted with the solid polyol being added to the melt. Alternatively, the methyl ester or acid chlorides can be used as the acid because these forms have generally lower melting points than their acid or anhydride counterparts. These methyl esters or acid chlorides can be reacted like the acid form with adjustments to the reaction conditions that are within the skill of one in this art. Because of the corrosive byproducts, the methyl ester form is generally a more preferred alternative to the acid when the acid has a high melt point.

If both the polybasic acid and the polyol have melting points that are too high for convenient melting, one can form a liquid phase "starter charge" of a different acid/polyol combination. This starter charge can comprise a starter charge carboxylic acid and a starter charge polyol m a molar ratio of acid to polyol of at least about 0.75, preferably about 0.75 to about 20, and more preferably about 0.9 to about 2.5. The second polycarboxylic acid and the second polyol for the hard resin can then be added in appropriate ratios to the liquid phase. The entire admixture then is reacted to the desired degree of completion.

The starter charge temperature will be low enough to avoid decomposition of any of the reactants and high enough to form a liquid phase. Appropriate temperatures will be between about 80° C. and the lowest decomposition temperature. Preferably, the starter charge temperature is about 150° C. to about 220° C.

The starter charge carboxylic acid and starter charge polyol can be selected from a wide variety of compounds. An exemplary group of starter charger acids includes the polyhydroxymonocarboxylic acids comprising dimethylolpropionic acid (DMPA), trimethylol acetic acid, dimethylolbutyric acid, dimethylolpentanoic acid, and mixtures thereof. These acids have a sterically hindered carboxylic acid group that is generally unreactive. As such, these acids act and should be calculated as diols unless steps are taken to make the hindered acid group reactive.

With appropriate catalysts, the restricted carboxylic acid may be reacted with a hydroxy group in the polyol. Appropriate catalysts for hindered acids include tetrabutyl titanate, zinc carbonate, ferric chloride, magnesium chloride, and lithium chloride. These catalysts can be used at up to about 1.0 wt % of the total weight.

Suitable starter charge polyols are those polyols described above which are useful as reactants for the hard resin of the invention. The most preferred starting polyol is pentaerythritol.

The use of DWA and PE is a particularly useful combination for the starter charge. The melt from a 1:1 molar ratio forms a continuous, low viscosity liquid phase at temperatures as low as 120° C. This is surprising because the melting point of DWA is 170°–180° C., and the melt point of PE is 260° C.

The esterified product of the hybrid reaction mixture can be a homogeneous or dishomogeneous mixture of esters. Dishomogeneous products can be detected by variable bail and ring softening temperatures. Routine experimentation can be used to determine compatibility between the liquid melt components and the higher melting acid/polyol combination.

The polyol resins according to the invention are characterized by providing solutions having high viscosity, good solubility, and stability against ultraviolet light and heat. Accordingly, the present polyol resins are conveniently used in the manufacture of jet engine lubricants that operate at high temperatures, varnishes, high solids paints that require low levels of solvent, fire retardant paints, and polyvinylchloride stabilizers. Polyol resins according to the invention are also useful as a replacement for dipentaerythritol in most uses.

The following examples will serve to illustrate the invention and should not be considered to limit the invention in any way. The invention is limited only by the scope of the appended claims.

The following examples 1–15 were prepared by melting the acid, anhydride, or methyl ester of the corresponding add and then adding the appropriate polyol. Examples 16–18 used a starter charge of 1 DMPA:1 PE. The reaction mixtures were then heated to about 215° C. and maintained at that temperature until the reaction indicated a low acid value. The resin was then cooled and tested for viscosity. The results are shown in Table 3.

TABLE 3

| No. | (moles) Acid | (moles) Polyol | cd | ab | B & R$^2$ | (Poise/deg. C.) Viscosity | Appearance |
|---|---|---|---|---|---|---|---|
| 1 | 1 PA | 2 PE | 8 | 2 | 86 | 28.4/150 | Solid |
| 2 | 1 MA | 2 PE | 8 | 2 | 102–103 | 57/150 | Sticky |
| 3 | 1 SA | 2 PE | 8 | 2 | 127 | 8.8/125 | Sl. Sticky |
| 4 | 1 DEF | 2 PE | 8 | 2 | 94.5 | 40/125 | Solid |
| 5 | 1 DMI | 2 PE | 8 | 2 | 101.5–102 | 50/150 | Solid |
| 6 | 1 DMT | 2 PE | 8 | 2 | 133 | 100/125 | Solid |
| 7 | 1 DMT | 2 TME | 6 | 2 | 71.0–71.5 | 24.8/125 | Fluid |
| 8* | 1 DMT | 2 TMP | 6 | 2 | 45.5–46.0 | 16.8/125$^1$ | Fluid |
| 9* | 1 DMT | 2 GLY | 6 | 2 | 25 | 3.6/125 | Fluid |

TABLE 3-continued

| No. | (moles) Acid | (moles) Polyol | cd | ab | B & R[2] | (Poise/deg. C.) Viscosity | Appearance |
|---|---|---|---|---|---|---|---|
| 10 | 2 DMT | 2 PE + 1 TMP | 11 | 4 | 67.8 | 8/125 | Fluid |
| 11 | 1 DMT + 1 AA | 3 PE | 12 | 4 | 108-110 | 37.2/125 | Sticky |
| 12* | 1 TMA | 3 PE | 12 | 3 | — | | Gel |
| 13* | 1 TMA | 1.5 PE + 1.5 TME | 7.5 | 3 | — | | Gel |
| 14 | 1 TMA | 0.6 PE + 2.4 TME | 8.4 | 3 | 109.5 | 40/150 | Solid |
| 15 Starter Charge of 1 DMPA:1 PE | 1 TMA | 3 TME | 9 | 3 | 100 | 100/150 | Solid |
| 16[3] | 1 TA | 2 PE | 8 | 2 | 124.5-127 86.5-87 | 26.4/125 | Solid |
| 17[3] | 1 IPA | 2 PE | 8 | 2 | 94.5-95.0 82.0-84.0 116.5-117.5 120.5-122.0 | 25.2/125 | Sticky |
| 18 | 1 TMA | 3 TME | 9 | 3 | 67.5 | 39.6/125 | Solid |

\* = Not in accordance with the invention
PA = Phthalic Anhydride
MA = Maleic Anhydride
SA = Succinic Anhydride
CEA = Chlorendic Anhydride
DEF = Diethyl Fumarate
DMI = Dimethyl Isophthalate
TMA = Trimellitic Anhydride
TA = Terephthalic Acid
DMT = Dimethylterephthalate
AA = Adipic Acid
PE = Pentaerythritol
TME = Trimethylolethane
TMP = Trimethylolpropane
GLY = Glycerine
IPA = Isophthalic Acid
[1] = viscosity in water, others in glycerine
[2] = ASTM E-28, Method 8, results in degrees Celsius
[3] = variable softening point

What is claimed is:

1. A method for making a resinous polyol ester having a ball and ring softening temperature of at least about 50° C., said method comprising:

forming a continuous liquid phase comprising a starter charge acid selected from the group consisting of dimethylolpropionic acid, trimethylol acetic acid, dimethylol butyric acid, dimethylolpentanoic acid, and blends thereof and a starter charge polyol selected from the group consisting of pentaerythritol, trimethylol ethane, trimethylolpropane, 1,6-hexanediol, 2,2,4-trimethylpentanediol, ethylene glycol, and mixtures thereof in a starter charge mole ratio of acid to polyol of at least about 0.75;

adding to said liquid phase a polycarboxylic acid and at least one second polyol in a mixture ratio represented by the following:

at least one acidic component of the formula: a $R^1$(acidic moiety)$_b$ wherein:

$R^1$ is aromatic, alkylaromatic, saturated or unsaturated cyclic, N or O substituted heterocyclic, or linear or branched aliphatic;

acidic moiety is a carboxylic acid moiety, an acid chloride, a C1-C6 acid ester, or the anhydride (—CO$_2$)O;

"a" represents the total number of number of moles of acid for each polyacid component and is at least 1; and "b" is the total number of acid moieties for each acid molecule at charge and is at least 2;

at least one polyol of the formula: $cR^3(OH)_4$ wherein:

$R^3$ is linear or branched aliphatic, saturated cyclic, or O substituted heterocyclic;

"c" represents the number of total number of moles of polyol and is greater than or equal to "a" but less than or equal to the product of "a" and "b"; and "d" is the total number of number of hydroxyl moieties per polyol molecule and is at least 3; and the product of "c" and "d" is the total number of moles for each individual acid multiplies by the number of acid moieties for said individual acid and is greater than or equal to the product of "a" and "b" which represents the total number of moles for each individual polyol multiplied by the number of hydroxyl moieties for said individual polyol (cd≧ab);

reacting the mixture of said liquid phase, said polycarboxylic acid and said at least one second polyol to a desired degree of completion.

2. A method according to claim 1 wherein the polycarboxylic acid is selected from the group consisting of: isophthalic acid, terephthalic acid, trimellitic acid, naphthalene dicarboxylic acid, pyridinedicarboxylic acid, dimethylterephthalate, isophthaloyl chloride, furandicarboxylic acid, benzenetetracarboxylic acid, benzenepentacarboxylic acid, benzenehexacarboxylic acid, phthalic anhydride, trimellitic anhydride, hexahydrophthalic anhydride, methyltetrahydrophthalic anhydride, succinic anhydride, maleic anhydride, citraconic anhydride, adipic acid, itaconic acid, diethyl fumarate, anhydrides, and methyl esters of each of the above.

3. A method according to claim 2 wherein the polycarboxylic acid is selected from the group consisting of terephthalic acid, succinic acid, isophthalic acid, maleic acid, fumaric acid, phthalic acid, anhydrides, and methyl esters of each of the above.

4. A method according to claim 1 wherein the at least one second polyol is selected from the group consisting of pentaerythritol, trimethylolethane, trimethylolpropane, glycerine, dipentaerythritol, ditrimethylolpropane, mannitol, sorbitol, and methyl glucoside.

5. A method according to claim 1 wherein the at least one second polyol is selected from the group consisting of pentaerythritol, trimethylolethane, trimethylolpropane, and glycerine.

6. A method according to claim 1 wherein the at least one second polyol is consists of a mixture of trimethylolethane and pentaerythritol.

7. The method of claim 1 wherein the starter charge mole ratio is between about 0.75 and 20.

8. The method of claim 7 wherein the starter charge mole ratio is between about 0.9 to 2.5.

9. The method of claim 1 wherein the starter charge polyol is selected from the group consisting of pentaerythritol, trimethylolethane, trimethylolpropane, 1,6-hexandiol, 2,2,4-trimethylpentanediol, ethylene glycol, and mixtures thereof.

10. A method according to claim 1 wherein the continuous liquid phase comprises dimethylolpropionic acid and pentaerythritol.

11. A method according to claim 10 wherein the dimethylolpropionic acid and pentaerythritol are present in a 1:1 molar ratio.

* * * * *

UNITED STATES PATENT AND TRADEMARK OFFICE
CERTIFICATE OF CORRECTION

PATENT NO. : 5,278,280

DATED : January 11, 1994

INVENTOR(S) : Paul E. Eckler

Page 1 of 2

It is certified that error appears in the above-identified patent and that said Letters Patent is hereby corrected as shown below:

Column 1, line 42, "tile" should read -- the --

Column 1, line 49, "wig" should read -- will --

Column 1, line 57, "m" should read -- in --

Column 1, line 57, "name" should read -- mixture --

Column 2, line 49, "sm" should read -- six --

Column 2, line 58, "heterocychc" should read -- heterocyclic --

Column 3, line 2, "dimethylrerephthalate" should read -- dimethylterephthalate --

Column 3, line 7, "succimc" should read -- succinic --

Column 3, line 19-20, "pentaerythntol" should read -- pentaerythritol --

Column 3, line 20, "tnmethylolpropane" should read -- trimethylolpropane --

Column 3, line 22, "ditirimethylolpropane" should read -- ditrimethylolpropane --

Column 3, line 26, "pentaerythntol" should read -- pentaerythritol --

Column 3, line 39, "m" should read -- in --

Column 3, line 43, "m" should read -- in --

Column 4, line 9, after the word "preferred" insert -- excess --

Column 5, line 45, "m" should read -- in --

UNITED STATES PATENT AND TRADEMARK OFFICE
CERTIFICATE OF CORRECTION

PATENT NO. : 5,278,280
DATED : January 11, 1994
INVENTOR(S) : Paul E. Eckler

It is certified that error appears in the above-identified patent and that said Letters Patent is hereby corrected as shown below:

Column 6, line 23, "DWA" should read -- DMPA --

Column 6, line 26, "DWA" should read -- DMPA --

Column 6, line 31, "bail" should read -- ball --

Column 6, line 51, "add" should read -- acid --

Column 7, line 64, following (OH) delete "4" and insert "d"

Column 8, line 39, "multiplies" should read -- multiplied --

Signed and Sealed this

Twentieth Day of September, 1994

Attest:

BRUCE LEHMAN

Attesting Officer

Commissioner of Patents and Trademarks